though not in view my inventory but relates not

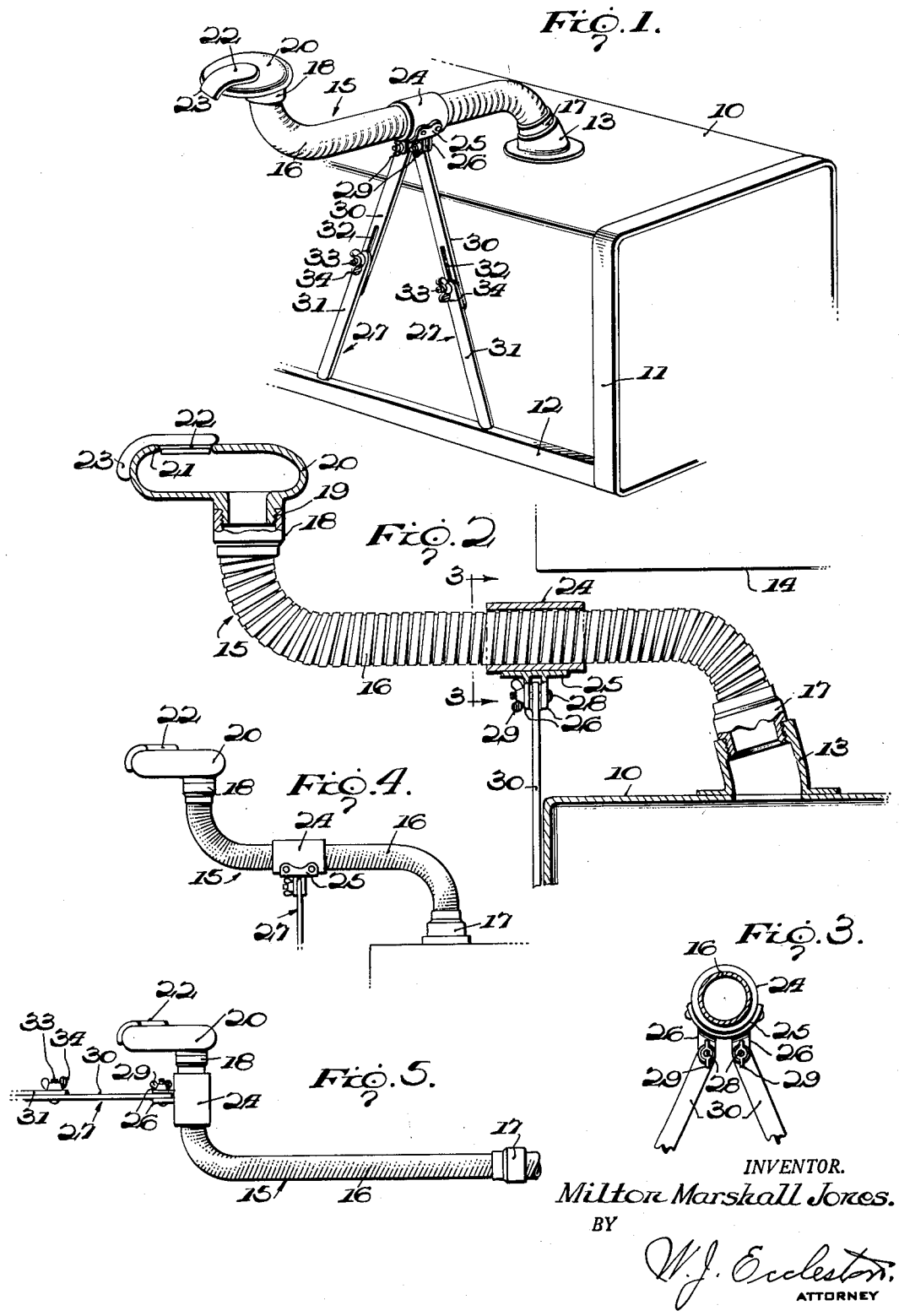

United States Patent Office 2,736,525
Patented Feb. 28, 1956

2,736,525

HOSE SUPPORT

Milton M. Jones, Philadelphia, Pa.

Application October 28, 1952, Serial No. 317,375

1 Claim. (Cl. 248—83)

(Granted under Title 35, U. S. Code (1952), sec. 266)

The invention described herein, if patented, may be manufactured and used by or for the Government for governmental purposes, without the payment to me of any royalty thereon.

My invention relates to a filling device or attachment for the gas tanks of certain automotive vehicles and the like.

A primary object of the invention is to provide a device which will facilitate filling the gasoline tanks of certain military vehicles, particularly the well-known ¼ ton Army truck or "Jeep," and the 2½ ton 6 x 6 Army truck.

A further object is to provide a tank-filling device which is highly simplified and inexpensive in construction, sturdy and durable, and adjustable so as to be usable for filling the tanks of various vehicles.

Other objects and advantages of the invention will be apparent during the course of the following description.

In the accompanying drawings forming a part of this application, and in which like numerals are employed to designate like parts throughout the same, Figure 1 is a perspective view of my tank-filling device as used for filling the gas tank of a 2½ ton 6 x 6 Army truck, Figure 2 is an enlarged central vertical longitudinal section through the device shown in Figure 1, parts in elevation, Figure 3 is a fragmentary vertical section on line 3—3 of Figure 2, Figure 4 is a side elevation of the device as used for filling the gas tank of a different type of vehicle, and, Figure 5 is a further side elevation of the device in a different operative position as when filling another type of tank.

In the drawings, where for the purpose of illustration is shown a preferred embodiment of my invention, attention is directed first to Figures 1 to 3 inclusive, wherein the numeral 10 designates the fuel tank of an automotive vehicle, such as a 2½ ton 6 x 6 Army truck. The tank 10 is fixedly mounted within a steel frame, including end supporting bands or loops 11 and lower longitudinal connecting bars or braces 12, rigidly secured to the end bands 11 in any preferred manner. The tank 10 is provided in its top and inwardly of its sides and ends with an upstanding internally screw-threaded tubular filling neck or pipe 13, rigidly secured thereto and registering with an opening in the top of the tank 10. The filling neck 13 is adapted to receive the usual screw-threaded closure cap, not shown.

As shown in Figure 2, the tank 10 is disposed below the truck body 14, and this arrangement renders it rather difficult to fill the tank 10 with fuel, particularly when the fuel must be supplied from portable 5-gallon containers which are standard Army equipment.

My filling device 15 greatly facilitates filling the tank 10 with fuel from a 5-gallon can or the like. The device comprises an elongated section 16 of flexible metal hose, of any preferred conventional type. Metal hose of this character is adapted to be bent into substantially any desired shape, and will tend to remain in the bent condition, due to its relative stiffness. The metal hose section 16 is provided at one end with an externally screw-threaded fitting or nipple 17, preferably swiveled thereto, and engageable within the internally screw-threaded neck 13 as shown. The other end of the metal hose section carries an internally screw-threaded swiveled fitting or nipple 18, receiving therein a tubular screw-threaded extension 19 of a hollow adapter or head 20. The head 20 is provided in its top with an opening 21, adapted to receive the nozzle of a hose, funnel or the like, and the opening 21 receives a cap or plug 22 of synthetic rubber or the like, having an integral side extension 23, permanently secured to the side of the head 20 by vulcanizing or by other suitable means. The rubber extension 23 is preferably tensioned for biasing the cap 22 in the closed position, and the cap is readily swung to an open position to facilitate the introduction of a hose nozzle or the like into the opening 21.

Adjustable means are provided for supporting the hose section 16 in selected adjusted positions. Such means comprises a collar or sleeve 24, slidably mounted upon the hose section 16 and freely adjustable longitudinally thereof between the fittings 17 and 18. An attaching element or band 25 is rigidly secured to the sleeve 24, and this band carries pairs of spaced apertured lugs 26, preferably formed integral therewith. The pairs of lugs 26 receive between them the corresponding ends of a pair of adjustable legs 27, as shown. The legs 27 are apertured near their ends adjacent to the sleeve 24, for the reception of bolts 28 which extend through the pairs of lugs 26 and legs 27, and have clamping wing nuts 29 mounted thereon. With this arrangement, the legs 27 are pivotally secured to the adjustable sleeve 24, and may be frictionally clamped in selected angularly adjusted positions.

The legs 27 comprise inner and outer leg sections 30 and 31, the inner leg sections 30 having longitudinal slots 32, receiving bolts 33, which also extend through openings formed in the outer leg sections 31. Clamping wing nuts 34 are carried by the bolts 33, and the arrangement is such that the inner and outer leg sections 30 and 31 are extensible longitudinally for distances limited by the lengths of the slots 32. The inner and outer leg sections are also angularly adjustable relative to each other, by virtue of the pivotal connections afforded by the bolts 33, and the leg sections may be frictionally clamped in selected angularly adjusted positions by means of the wing nuts 34.

When the device is used in connection with the fuel tank of a 2½ ton 6 x 6 truck, as shown in Figures 1 and 2, the nipple 17 is connected with the filling neck 13, and the metal hose section 16 is bent into the form indicated for providing the substantially horizontal portion extending beneath the truck body 14 and beyond the adjacent side of the truck. The fitting 18 and head 20 are thus upwardly directed and spaced outwardly of the truck body.

The legs 27 are now adjusted to the proper lengths and are preferably swung apart to substantially the angular positions shown in Figure 1, and the wing nuts 29 and 34 are tightened. The sleeve 24 is adjusted along the horizontal portion of the metal hose 16 until the legs 27 engage the side of the tank 10 and having their lower ends resting upon the adjacent bar 12 of the tank supporting frame. With the parts so adjusted, the metal hose section 16 will remain in the desired position while the fuel is being introduced into the same by way of the opening 21, from a 5-gallon can, hose or the like.

In Figure 4, I have shown my filling device in use for filling the fuel tank of another type of vehicle, such as an Army "Jeep." The nipple 17 is shown connected with the filling neck of the vehicle fuel tank, and the sleeve 24 is adjusted along the metal hose section so that the legs 27 may rest upon the floor of the "Jeep" or other suitable structure.

Still another adjusted position of the device is illustrated in Figure 5, as when the same is used for filling a tank having an opening in its side. In such case, the nipple 17 is connected with the filling pipe or extension of the tank, and the head 20 is upwardly directed as shown. The sleeve 24 in this instance has been shifted to the vertical portion of the metal hose section 16, and the adjustable legs 27 are horizontally disposed and extend beyond the side of the sleeve 24. The legs 27 may now rest upon any suitable rigid support, such as part of a vehicle body or the like.

The hose section 16 may be adjusted or bent to assume substantially any desired shape, and the sleeve 24 is adjustable upon the metal hose section at any desired point. The legs 27 may be swung apart or drawn together and locked in position by means of the wing nuts 29, and the inner and outer leg sections 30 and 31 may be adjusted longitudinally and angularly in accordance with the requirements of the application of the device to a particular tank or the like. In any event, the adjustable sleeve 24 and legs 27 serve to support the metal hose section in the desired position while the fuel is being conducted to the relatively inaccessible opening of the tank.

It is to be understood that the form of my invention herewith shown and described is to be taken as a preferred example of the same, and that various changes in the shape, size and arrangement of parts may be resorted to, without departing from the spirit of the invention or scope of the subjoined claim.

Having described my invention, I claim:

An adjustable supporting device for a hose or the like comprising a substantially rigid open-ended cylindrical sleeve adapted to slidably receive the hose and freely movable longitudinally of the hose to a selected adjusted position and free from clamping engagement with the hose, companion pairs of spaced opposed apertured lugs secured to the sleeve near its longitudinal center in circumferentially spaced relation and extending generally radially of the sleeve, the apertures of the lugs of each pair being in alignment and having their axis extending parallel to the longitudinal axis of said sleeve, a pair of longitudinally extensible legs extending substantially radially of the sleeve and having their upper ends engaging between the lugs of each pair, said upper ends of the legs having openings for substantial registration with the apertures of said lugs, bolts extending through the apertures of said lugs and legs and arranged parallel to the longitudinal axis of said sleeve and serving to pivotally secure the legs to the sleeve, whereby the legs may be swung in arcs circumferentially of the sleeve and about their inner ends to selected radially adjusted positions relative to said sleeve, clamping nuts carried by said bolts and engaging one lug of each pair for releasably clampingly securing the legs in their selected radially adjusted positions, and adjustable means carried by the extensible legs for releasably securing them in selected longitudinally adjusted positions.

References Cited in the file of this patent

UNITED STATES PATENTS

| | | |
|---|---|---|
| 493,719 | Henderson | Mar. 21, 1893 |
| 1,007,657 | Freund | Oct. 31, 1911 |
| 1,128,248 | Hetzel | Feb. 9, 1915 |
| 1,431,573 | Dunfee et al. | Oct. 10, 1922 |
| 1,463,202 | Douglas | July 31, 1923 |
| 1,572,049 | Stephenson | Feb. 9, 1926 |
| 1,662,820 | Condupa | Mar. 20, 1928 |
| 1,788,675 | Johnson | Jan. 13, 1931 |
| 2,299,629 | Jordan | Oct. 20, 1942 |
| 2,628,796 | Krizman | Feb. 17, 1953 |

FOREIGN PATENTS

| | | |
|---|---|---|
| 568,264 | Germany | of 1933 |